United States Patent [19]
Ledford et al.

[11] 4,299,811
[45] Nov. 10, 1981

[54] DEGASSING MOLTEN SULFUR

[75] Inventors: Thomas H. Ledford, Baton Rouge, La.; Howard Lerner, Parsippany, N.J.

[73] Assignee: Exxon Research & Engineering Co., Florham Park, N.J.

[21] Appl. No.: 174,504

[22] Filed: Aug. 1, 1980

[51] Int. Cl.³ .......................................... C01B 17/027
[52] U.S. Cl. ............................................. 423/578 R
[58] Field of Search ..................... 423/567, 578; 55/36

[56] References Cited

U.S. PATENT DOCUMENTS 2,169,261  8/1939  Lee et al. ............................ 423/578
3,278,269  10/1966 Ekker et al. ......................... 423/567
3,447,903  6/1969  Wiewiorowski ............... 423/578 X

FOREIGN PATENT DOCUMENTS 2254375  5/1973  Fed. Rep. of Germany ...... 423/578
1393967  5/1975  United Kingdom .

Primary Examiner—G. O. Peters
Attorney, Agent, or Firm—Edward H. Mazer

[57] ABSTRACT

A method for reducing the hydrogen sulfide, hydrogen polysulfides and/or ash content of molten sulfur is disclosed. The subject invention is directed at the addition of an effective amount of a degassing agent selected from the class consisting of inorganic phosphorous compounds, urea and urea derivatives without the necessity for also adding sulfur dioxide to the molten sulfur.

12 Claims, 3 Drawing Figures

DEGASSING MOLTEN SULFUR

BACKGROUND OF THE INVENTION

This invention relates to a process for the removal of $H_2S$ from molten sulfur. More specifically this invention relates to the removal of residual $H_2S$ from molten sulfur by the addition to the molten sulfur of one or more compounds described hereinafter which promote the removal of $H_2S$ and hasten the decomposition of hydrogen polysulfides to $H_2S$. Hastening this decomposition permits convenient disposal of the released $H_2S$ before the sulfur is shipped by the manufacturer.

During the manufacture of elemental sulfur, particularly by the reaction of:

$$2H_2S + SO_2 \rightarrow 3S + H_2O \qquad (1)$$

small quantities of $H_2S$ and hydrogen polysulfides, typically 150-300 parts per million by weight (wppm), may remain in the molten sulfur. During storage the hydrogen polysulfides decompose to hydrogen sulfide, which is slowly released by the sulfur. This slow release of hydrogen sulfide is undesirable for several reasons. Since the threshold odor limit of $H_2S$ in air is relatively low, approximately 0.1 parts per million by volume (vppm), this slow release may create nuisance odors. Moreover, $H_2S$ is highly toxic, flammable and may form explosive mixtures with air. Accordingly, the presence of $H_2S$ in molten sulfur is being limited in many locations by increasing stringent regulations.

Several methods have been used to decrease the residual hydrogen sulfide and hydrogen polysulfides concentration in sulfur. One method has been merely to allow a "weathering off" process to take place before the sulfur is transported. But, this is a relatively slow process that requires large sulfur storage capacity.

A method for increasing the rate of this "weathering off" process uses a circulatory spraying system. However, this requires the purchase and use of additional circulatory equipment and may not reduce the residual hydrogen sulfide and hydrogen polysulfide to sufficiently low levels.

Other methods have involved the addition of chemical compounds and sulfur dioxide to the molten sulfur to convert the hydrogen sulfide and hydrogen polysulfides to elemental sulfur. British Pat. No. 1,393,967 describes a method for reducing the amount of hydrogen polysulfides and hydrogen sulfide by in situ reaction to form elemental sulfur. Sulfur dioxide and an additive, which is an inorganic alkali metal compound, ammonia, an ammonium compound or a basic organic compound with at least one amino group, is injected into the liquid sulfur while the sulfur is flowing through a conduit. Table I of this patent indicates that large amounts of $H_2S$ remain in the molten sulfur when $SO_2$ is not added together with the additives noted. U.S. Pat. No. 3,447,903 discloses the addition of certain classes of compounds together with $SO_2$ to molten sulfur for a variety of purposes, including the removal of small quantities of hydrogen sulfide. Among the classes of compounds disclosed are:

(A) Ammonia and its organic derivatives having a $K_B$ greater than $10^{-10}$;

(B) Primary, secondary and tertiary alkyl, aryl and cyclic amines having a $K_B$ greater than $10^{-10}$;

(C) Quaternary basic nitrogen compounds that decompose between 20° and 160° C. to yield ammonia or its inorganic derivatives having a $K_B$ value greater than $10^{-10}$; and (D) Quaternary basic nitrogen compounds that on heating to temperatures between 20° and 160° C., decompose to yield an organic amine having a $K_B$ value greater than $10^{-10}$. However, this process requires the further addition of sulfur dioxide to react with the $H_2S$ in place and form sulfur rather than liberating the $H_2S$.

Use of $SO_2$ to remove $H_2S$ from molten sulfur is not desirable for several reasons. Sulfur dioxide is difficult to store, since it is gaseous at ambient conditions. Thus, means must be provided for injecting the $SO_2$ directly into the molten sulfur and for adjusting the relative quantities of $SO_2$ and the other additive metered into the molten sulfur. In addition, $SO_2$ is toxic, a strong irritant to the eyes and mucous membranes and an air contaminant. Moreover, $SO_2$ is corrosive to the carbon steel surfaces of some sulfur handling facilities. These factors may complicate or restrict its use in commercial facilities.

U.S. Pat. No. 3,278,269 describes several classes of compounds which may be added to molten sulfur to improve the friability of solidified sulfur. The compounds disclosed include the following:

A. Liquid and solid primary, secondary and tertiary alkyl, aryl, and cyclic amines having a $K_B$ value greater than $10^{-10}$ in which the amino nitrogen is attached to a primary, secondary or aromatic hydrocarbon;

B. Quaternary nitrogen compounds that decompose between 20°-160° C. to yield ammonia; and C. Quaternary nitrogen compounds that on heating to temperatures between 20° and 160° C. decompose to yield an organic amine having a $K_B$ value greater than $10^{-10}$ in which the carbon atom directly attached to the amino nitrogen is primary, secondary or aromatic.

U.S. Pat. No. 3,364,655 discloses that $H_2S$ can be removed from liquid sulfur by atomizing the sulfur, and that this process can be further improved by the addition of ammonia.

In Z. Anal. Chem. 166 (1959) pages 274-283 Schmidt and Talsky describe a method to convert hydrogen polysulfides to hydrogen sulfide by the addition to the sulfur of sulfites or cyanides.

It is desirable to provide a process in which the residual hydrogen sulfide and hydrogen polysulfides are reduced to relatively low levels without the use of excessively large, or corrosion resistant storage facilities.

It is also desirable to provide a process in which the hydrogen sulfide and hydrogen polysulfides can be reduced to relatively low levels in the molten sulfur by the addition of degassing agents that do not require complex addition or metering facilities.

It is also advantageous to provide a process in which the hydrogen sulfide and hydrogen polysulfides are reduced to lower levels by the addition of chemical compounds that do not significantly increase the ash content of the product sulfur and may, in certain instances, reduce the product sulfur ash content.

SUMMARY OF THE INVENTION

The subject invention is a method for reducing the concentration of hydrogen sulfide and hydrogen polysulfides in molten sulfur comprising the addition to the sulfur of an effective amount of a degassing agent selected from the class of compounds consisting of inorganic phosphorous compounds, urea and urea derivatives without the further addition to the molten sulfur of sulfur dioxide. Among the preferred inorganic phosphorous compounds are the phosphates, phosphines, phosphites, phosphine oxide and hypophosphates. Among the preferred urea derivatives are mono-, di, tri- and tetra ureas, thiourea, and cyclic ureas. In one preferred method an aqueous solution of the degassing agent or a melt of the degassing agent is metered by gravity flow into the molten sulfur. In another method, an aqueous solution or a melt of the degassing agent is pumped into the molten sulfur.

DETAILED DESCRIPTION OF THE INVENTION

Figure 1:
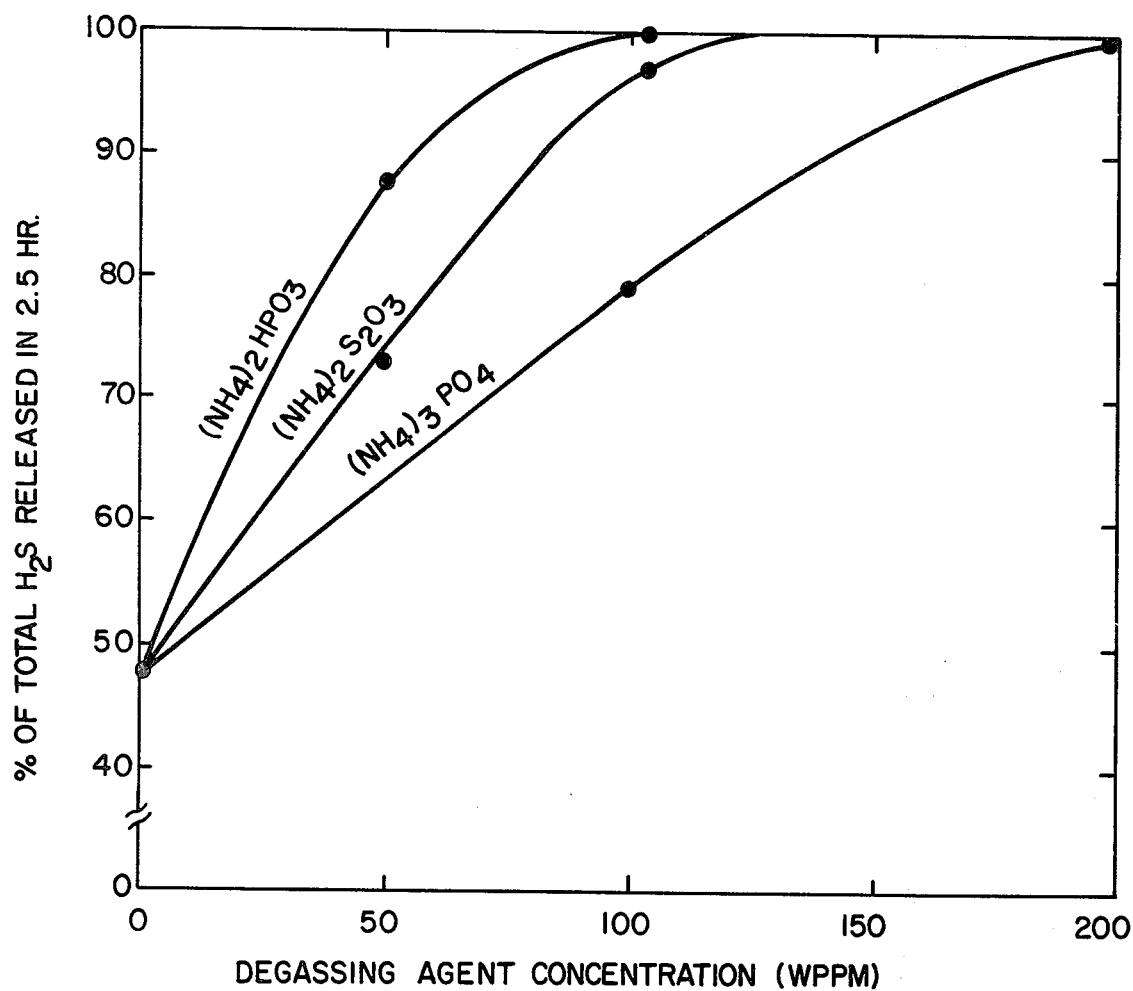
FIG. 1 is a plot of the percentage of the hydrogen sulfide and hydrogen polysulfides removed from samples during a 2.5 hour period as a function of the degassing agent concentration for three degassing agents.

Molten sulfur from conventional sulfur recovery sources typically may contain as much as 700 parts per million by weight (wppm) of $H_2S$ and hydrogen polysulfides. The degassing agents used to convert hydrogen polysulfides to hydrogen sulfide preferably should be effective at relatively low concentrations and be relatively easily volatilized from the sulfur so that they do not adversely affect the residual ash content of the product sulfur. The compounds described hereinafter have been found to be effective degassing agents at relatively low concentrations, thereby minimizing their effect on the product sulfur ash content. Many of the compounds described hereinafter are readily volatilizable. This further minimizes their effect on product sulfur ash content. It has been found that certain classes of compounds are effective degassing agents as indicated below:

A. Sulfur compounds comprising dithionates, dithionites, thiosulfates, bisulfides and bisulfites. Among the preferred compounds are easily volatilizable salts, such as ammonium, phosphonium and alkyl ammonium salts. Specific preferred compounds are ammonium thiosulfate and ammonium bisulfite. A non-ammonium salt which is effective is sodium dithionite.

B. Inorganic and organo phosphorous compounds including phosphates, hypophosphates, phosphines, phosphites, phosphine oxides and phosphine sulfides.

Preferred compounds are the easily volatilized salts, such as ammonium phosphonium and alkyl ammonium salts. Specific preferred compounds are triammonium orthophosphates, diammonium hydrogen phosphate and triphenyl phosphine.

C. Urea and urea derivatives, including but not limited to urea, thiourea, mono-, di-, tri-, and tetra-ureas and cyclic ureas.

Preferred compounds are those easily volatilized, such as urea and thiourea.

Samples of candidate degassing agents were screened for effectiveness according to the following procedure. Samples of molten sulfur were taken from the combustor rundown line of a commercial sulfur plant so that sulfur having the highest $H_2S$ levels would be obtained for testing purposes. The samples, approximately 150 ml each, were poured from a sample dipper directly into spoutless 300 ml Berzelius beakers which also were used to contain the sulfur during analysis. The samples were kept hot during transport to the laboratory. A three-hole rubber stopper equipped with a thermometer and two unequal lengths of glass tubing was placed in the beaker opening. One piece of glass tubing extended below the surface of the sulfur while the other terminated above the surface. Each compound screened was added to a stirred sulfur sample maintained at 130° C. Dry nitrogen was sparged through each sample for 2.5 hours with the released $H_2S$ and exiting nitrogen being directed through two gas absorption bottles containing a 3% zinc acetate solution. After the sulfur was purged for 2.5 hours, the two gas absorption bottles were removed and replaced by two gas absorption bottles containing fresh 3% zinc acetate solution positioned as previously described.

Although lead sulfide is known in the art to be highly effective in promoting the decomposition of hydrogen polysulfides to $H_2S$, this compound is not used commercially to degas molten sulfur because of toxicity concerns from the presence of trace amounts of lead in the sulfur and because lead sulfide would increase the ash content of the sulfur. This known effectiveness of lead sulfide was used as a standard to determine the degassing characteristics of the compounds screened. One gram of lead sulfide was then added to the sulfur samples containing the degassing agents to decompose any hydrogen polysulfides which had not been removed by the degassing agent added during the first 2.5 hour period. Dry nitrogen was again sparged through the molten sulfur for a 2.5 hour period, the exiting nitrogen and $H_2S$ passing into the absorption train. The gas absorption bottles from the first and second 2.5 hour periods were poured into separate beakers for titration by a standard iodometric method. A known quantity of standardized iodine solution was added to each beaker and the unreacted iodine subsequently back-titrated with a standardized thiosulfate solution. This method is described in more detail in the Analytical Chemistry Of Sulfur And Its Compounds, Edited by J. H. Karchmer, Part I, John Wiley & Sons, NY Pages 63–66 (1970), the disclosure of which is incorporated herein by reference. The effectiveness of each compound screened was determined by comparing the amount of $H_2S$ removed during the first 2.5 hour period with that removed during the second 2.5 hour period. The higher the ratio of the $H_2S$ removed during the first period relative to the second period, the more effective was the additive. Analytical results for various compounds tested are shown in Tables I, II and III at additive concentrations of 200, 100 and 50 weight parts per million (wppm) respectively, in the molten sulfur. In Table I, all samples having the same test group number were drawn on the same day and have comparable initial $H_2S$ values.

TABLE I

| | TESTS AT 200 WPPM ADDITIVE LEVEL | | |
|---|---|---|---|
| Test Group | Additive | First 2.5 hr. With Additive (ppm $H_2S$) | Second 2.5 hr. With PbS (ppm $H_2S$) | Total (ppm $H_2S$) |
| 1 | None | 246 | 282 | 528 |
| 1 | $H_2O$(<1000 ppm) | 167 | 355 | 522 |
| 2 | $NH_4Cl$ | 218 | 272 | 490 |
| 2 | $NH_4HSO_4$ | 259 | 266 | 525 |
| 3 | $(NH_4)_2C_2O_4$ | 314 | 310 | 624 |
| 3 | $(NH_4)_2S_2O_3$ | 619 | 3 | 622 |

TABLE I-continued
TESTS AT 200 WPPM ADDITIVE LEVEL

| Test Group | Additive | First 2.5 hr. With Additive (ppm H$_2$S) | Second 2.5 hr. With PbS (ppm H$_2$S) | Total (ppm H$_2$S) |
|---|---|---|---|---|
| 3 | Na$_2$S$_2$O$_4$ | 583 | 6 | 589 |
| 3 | (C$_6$H$_5$)$_3$P | 625 | 32 | 657* |
| 4 | NH$_4$SCN | 331 | 190 | 521 |
| 4 | (NH$_4$)$_3$PO$_4$ | 497 | 4 | 503 |
| 5 | CO(NH$_2$)$_2$ | 486 | 18 | 504 |
| 6 | (NH$_4$)$_2$S$_2$O$_8$ | 213 | 159 | 372 |
| 7 | (NH$_2$)$_2$CS | 614 | 0 | 614 |
| 8 | NH$_4$CO$_2$H | 335 | 498 | 833 |

*Some phosphine carried by the sparge gas into the solution causes an artificially large value because the analysis cannot distinguish between phosphines and H$_2$S.

TABLE II
TESTS AT 100 WPPM ADDITIVE LEVEL

| Additive | First 2.5 Hrs. With Additive | Second 2.5 Hr. With PbS | Total H$_2$S (wppm) |
|---|---|---|---|
| NH$_4$HSO$_3$ | 289 | 153 | 442 |
| (NH$_4$)$_2$SO$_3$ | 421 | 25 | 446 |
| (NH$_4$)$_2$S$_2$O$_3$ | 428 | 2 | 430 |
| (NH$_4$)$_3$PO$_4$ | 374 | 93 | 467 |

TABLE III
TESTS AT 50 WPPM ADDITIVE LEVEL

| Additive | First 2.5 Hrs. With Additive | Second 2.5 Hr. With PbS | Total H$_2$S (wppm) |
|---|---|---|---|
| (NH$_4$)$_2$SO$_3$ | 401 | 145 | 546 |
| (NH$_4$)$_2$S$_2$O$_3$ | 418 | 162 | 580 |
| (NH$_4$)$_2$HPO$_4$ | 496 | 74 | 570 |
| (NH$_4$)$_3$PO$_4$ | 272 | 310 | 582 |

The relative degassing ability of the compounds may be seen more clearly by their effectiveness at low concentrations in the sulfur. The relative effectiveness of three selected compounds in degassing sulfur at varying concentrations in the sulfur may be seen from FIG. 1, in which the degassing agent concentration is plotted against the percent of the total H$_2$S released in the first 2.5 hours.

The data in Table I show that the ammonium ion is not the portion of the ammonium salt that was active in degassing the molten sulfur. For example, ammonium chloride and ammonium bisulfate were totally ineffective as degassing agents. Even ammonium salts of weaker acids such as oxalic, formic and carbonic acids were much less effective than the best degassing agents tested, ammonium thiosulfate, ammonium phosphate, and sodium dithionite.

The ash content of the molten sulfur sample with no degassing agent present and with one degassing agent, ammonium thiosulfate, was determined and is presented in Table IV. In both series of tests the ash determination involved merely burning a 100 gram sample of the sulfur in a pre-weighed crucible and weighing the ash remaining in the crucible after combustion and subsequent cooling in a desiccator.

The possibility that some interaction of ammonium thiosulfate with either carbon steel or concrete from the molten sulfur facility might cause increased sulfur ash content, also was examined. Samples of sulfur were kept at 130°-140° C. for 24 hours while suspended within them were small blocks of concrete and small samples of carbon steel. Two thousand wppm of ammonium thiosulfate was added to one sample while another was left with no degassing agent. Both the treated sulfur and the untreated control were sampled from their top strata and from near the bottom of their respective containers. These tests were done with samples both low and high in ash content. The results are shown in Table IV.

TABLE IV
ASH TESTS IN PRESENCE OF CONCRETE AND CARBON STEEL

| | Treated Sample (2,000 ppm (NH$_4$)$_2$S$_2$O$_3$) Ash Content (wppm) | Untreated Sample (No Additive) Ash Content (wppm) |
|---|---|---|
| Low Ash Sulfur | | |
| Sample from top | 8.7 | 2.9 |
| Sample from bottom | 25.6 | — |
| High Ash Sulfur | | |
| Sample from top | 269 | |
| Sample from bottom | 10,280 | 11,780 |

The ammonium thiosulfate caused no corrosion of metal or damage to concrete in these tests. The rate of corrosion of carbon steel actually decreased after the addition of ammonium thiosulfate.

The increase in the ash content of the sample drawn from the top of the high ash sulfur may be attributable in part to ash containing compounds rising from the bottom to the top of the sample.

In laboratory tests it was found advantageous to have continuous stirring of the sulfur during the degassing process. In two hour tests, substantially similar to those previously described, a significantly greater amount of H$_2$S was degassed when the sample was stirred, than when no stirring was done, a shown in Table V.

TABLE V

| H$_2$S REMOVAL WPPM FROM SAMPLES | |
|---|---|
| No Stirring | Continuous Stirring |
| 265,296 | 408 |

It was believed that continuous mixing was necessary for reducing the hydrogen sulfide and hydrogen polysulfide concentrations to relatively low levels in commercial facilities. Surprisingly, however, in a commercial-sized installation the sulfur could be degassed to relatively low levels merely by gravity feeding the degassing agent into the molten sulfur through the inspection box or look box in the inlet line to the sulfur pit. After addition of the degassing agent was started, the residual concentration of hydrogen sulfide and hydrogen polysulfides decreased with time to relatively low levels. Such a degassing agent addition system has several advantages over complex mixing, metering and/or recirculation systems. The simplicity of this system greatly decreases equipment purchase and operating costs, while providing a more reliable, trouble-free addition system.

Figure 2:
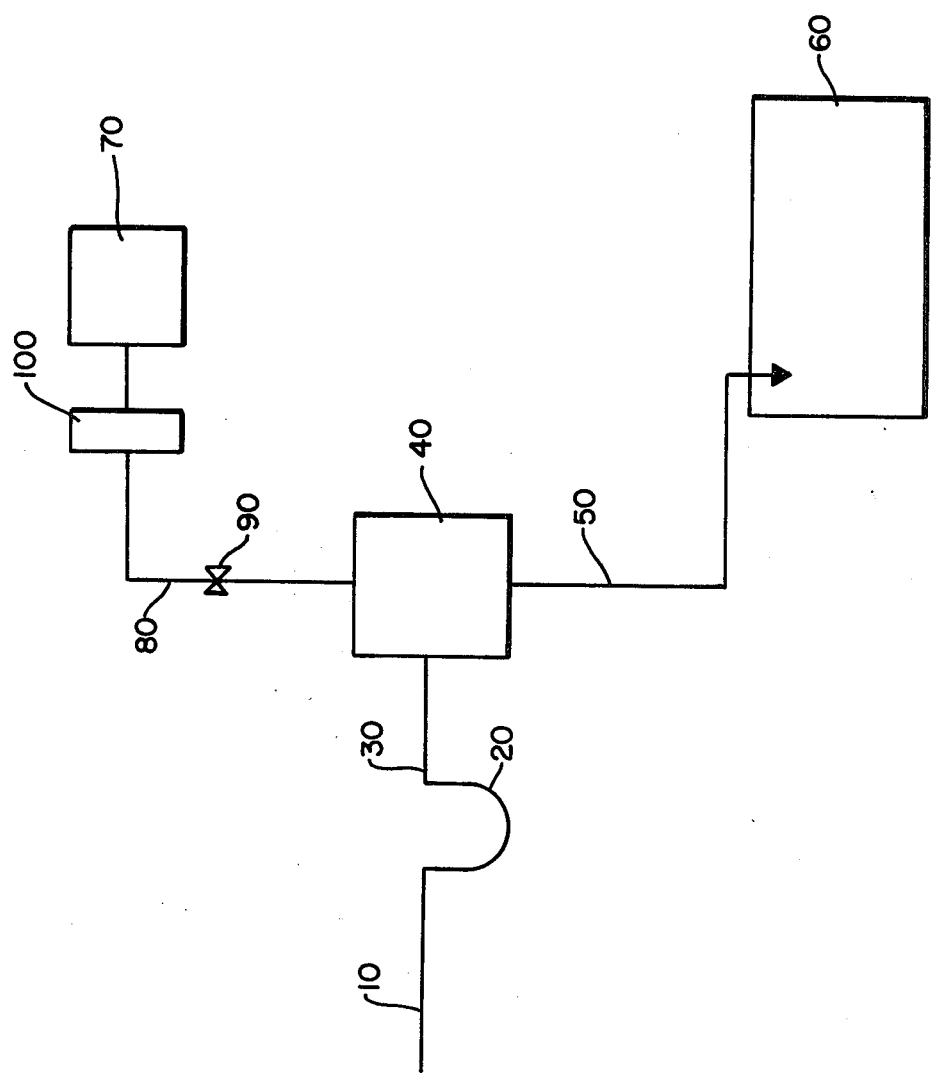
FIG. 2 is a simplified drawing of a molten sulfur facility with means for adding a degassing agent to the sulfur.

In FIG. 2 a preferred embodiment for adding the degassing agent to a conventional molten sulfur facility is shown. The facility comprises an inlet, inspection box, outlet and sulfur pit. In this figure, many lines, valves and all instrumentation has been omitted for simplicity. Molten sulfur leaving the sulfur recovery system passes through inlet 10 at a temperature in excess of 114° C., typically about 130° to about 165° C. The sulfur then passes through seal 20 and line 30 into inspection box 40. The molten sulfur, typically containing about 50 to about 650 wppm of hydrogen sulfide and hydrogen polysulfides, leaves inspection box 40 through line 50 for storage and cooling in a sulfur storage facility such as sulfur pit 60. A solution, preferably an aqueous solution, of at least one of the degassing agents is metered into inspection box 40 from storage tank 70 through line 80. Alternatively, if the melting point of the specific degassing agent utilized is below the temperature of the molten sulfur, the degassing agent may be added as a melt. To minimize the equipment required, storage tank 70 may be placed above inspection box 40, and the degassing agent gravity fed. The flow rate is controlled by metering valve 90. The degassing agent solution or melt also may be metered into the molten sulfur installation using a conventional pump. A filter 100 also may be added to minimize contamination of the molten sulfur and to prevent plugging of metering valve 90.

In many locations the tail gas from the reaction of $H_2S$ and $SO_2$ for producing elemental sulfur is treated to remove small amounts of $H_2S$ by a series of reactions in an aqueous solution containing inorganic salts. Occasionally these inorganic salts are carried into the product sulfur. In one test a degassing agent ammonium thiosulfate was added as an aqueous solution having 55 wt. % ammonium thiosulfate to molten sulfur having a temperature ranging between about 125° and 150° C. The concentration of ammonium thiosulfate in the sulfur entering the sulfur pit without mechanical agitation was approximately 118 wppm. The average residence time of the sulfur in the pit was 70–80 hrs. It was noted within the first few hours that a thick crust formed on the sulfur surface. As indicated in Table VI the ash content of the sulfur, measured in a sample taken from the pit surface, was 74–85 wppm before the addition of ammonium thiosulfate was started. After 70 hours from the start of the ammonium thiosulfate addition, the ash content of the sulfur dropped to 47–55 wppm but the $H_2S$ content of the sulfur was not significantly reduced. Later tests with an aqueous solution containing 20–40 wt.% urea showed that it, too, has the property of causing this separation of ash from sulfur and formation of a layer that may be skimmed from the sulfur surface.

To determine if the crust formed on the surface of the sulfur may have inhibited the volatilization of hydrogen sulfide from the sulfur pit, a test using an aqueous solution having 55 wt.% ammonium thiosulfate as the degassing agent was done in a four-stage sulfur pit having a total average residence time of about 6 hours, but with mechanical sulfur recirculation.

TABLE VI

| EFFECT OF ADDING AMMONIUM THIOSULFATE IN A CONVENTIONAL SULFUR PIT ON THE $H_2S$ CONCENTRATION OF SULFUR | | | | |
|---|---|---|---|---|
| Time after Addition of $(NH_4)_2S_2O_3$ Started, Hrs. | $H_2S$ Concentration in Sulfur; wppm | | Ash Content of Sulfur; wppm | |
| | In Sulfur Pit | Exiting Sulfur | Sulfur Pit | From Loading Truck |
| 0 (i.e. before addition started) | 219, 220, 220, 236 | — | 74, 85 | — |
| 20 | 231, 237 | 190, 194 | — | 74, 71 |
| 43 | 241, 176 | 218, 264 | — | 71, 70 |
| 66 | 181, 188 | — | — | — |
| 70 | 199, 114 | 164, 164 | — | 47, 55 |
| 89 | 201, 189, 210 | — | — | — |
| 171 | 213, 224 | — | — | — |

Stages 1, 2 and 3 were equipped with sulfur recirculation pumps having 160, 130 and 150 GPM capacities, respectively, to recirculate the sulfur within the same stage. These results are presented in Table VII and indicate that on a commercial scale ammonium thiosulfate effectively catalyzes the degassing of sulfur.

TABLE VII

| EFFECT OF AMMONIUM THIOSULFATE ON THE PERFORMANCE OF SULFUR DEGASIFICATION FACILITY WITH CIRCULATION | | | | | | | |
|---|---|---|---|---|---|---|---|
| Set of Samples No. | Time After Addition of $(NH_4)_2S_2O_3$ in the Run Started, Hrs. | Ammonium Thiosulfate Addition Rate, wppm | Residence Time of Sulfur in Each Stage, Hrs. | $H_2S$ Concentration in Sulfur, wppm | | | |
| | | | | 1st Stage | 2nd Stage | 3rd Stage | 4th Stage |
| | | | | | | | (Inactive without recirculation pump) |
| 1 | — | 0 | 1.2 | 259–263 | 228 | 204 | 185–194 |
| 2 | — | 0 | 1.6 | 339 | 339 | 328 | 315 |
| 3 | — | 0 | 1.6 | 275 | 211 | 168 | 170 |
| 4 | 5½ | 50 | 1.4 | 76 | 20 | 6 | 5 |

It should be noted that the hydrogen sulfide and hydrogen polysulfides concentration in Table VII decrease after the addition of ammonium thiosulfate when the sulfur was recirculated. The data of Tables VI and VII thus indicate that ammonium thiosulfate is an effective degassing agent, and that it also may decrease the sulfur ash content.

Figure 3:
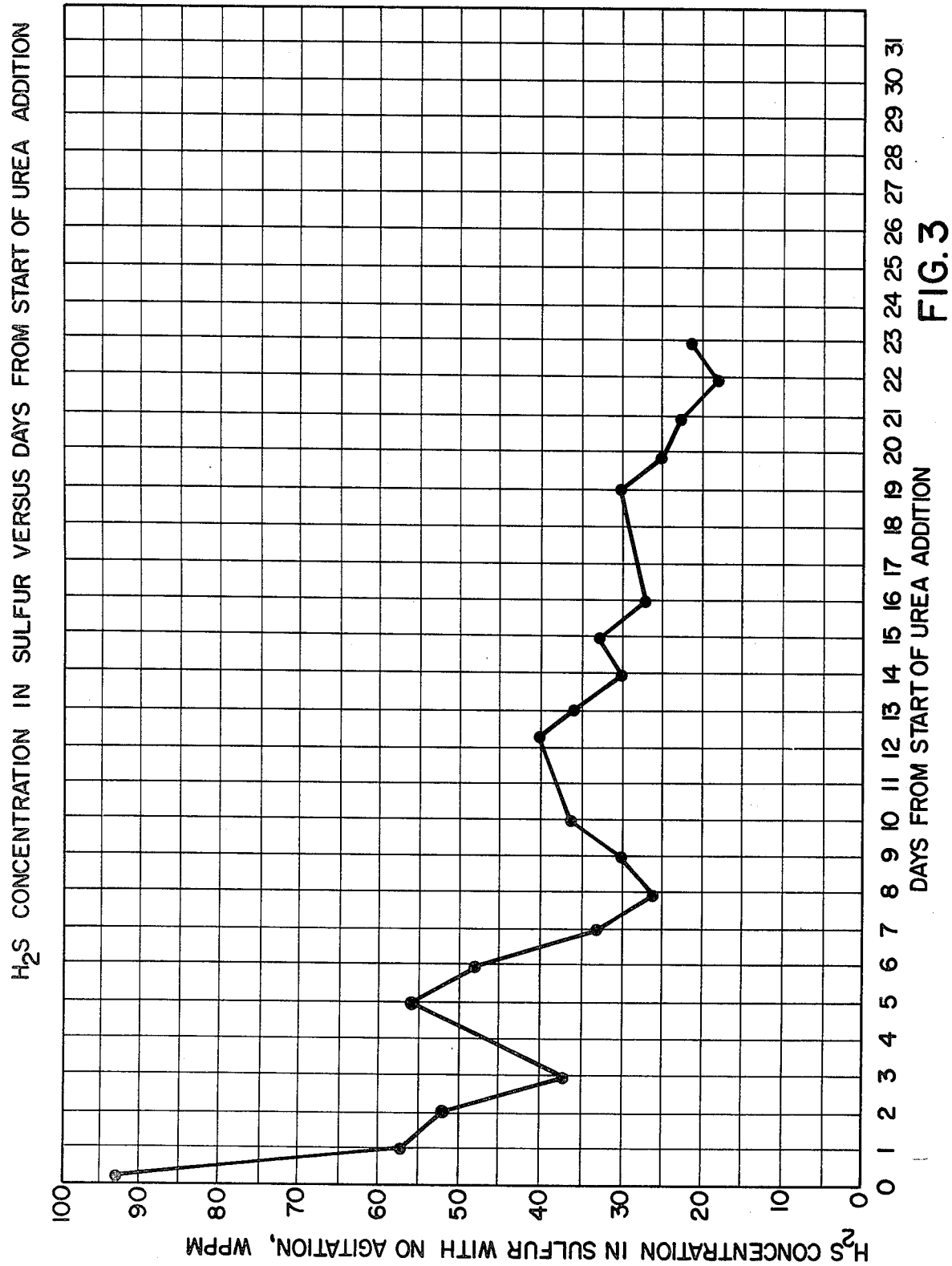
FIG. 3 is a plot of the residual $H_2S$ concentration in sulfur as a function of time after starting the addition of a specific degassing agent.

FIG. 3 is a plot of the residual $H_2S$ concentration in molten sulfur contained in a non-stirred sulfur pit where the sulfur, to which about 100 wppm of urea was added, had an average residence time ranging from about 3.5 to about 6 days. The residual concentration of $H_2S$ decreased significantly, illustrating that continuous use of urea also decreases the residual $H_2S$ concentration of the sulfur even in the absence of sulfur agitation. The ash content of the sulfur, both at the commencement and termination of the test, remained at less than 5 wppm, thus indicating that the urea addition did not adversely affect the ash content of the sulfur.

The concentration of degassing agent utilized is not critical and will be dependent on the specific agent used. Generally, the rate of addition of the degassing agent to the molten sulfur will range between 1 (one) part per billion and 5000 parts per million by weight, and preferably from about 50 to about 200 parts per million by weight.

While the invention has been described with respect to specific compounds and a specific embodiment, it will be understood that this disclosure is intended to cover any variations, uses, or adaptations of the invention including such departures from the present disclosure as come within known or customary practice in the art to which the invention pertains as a fall within the scope of the invention.

What is claimed is:

1. A method for reducing the hydrogen sulfide and hydrogen polysulfides concentration in molten sulfur comprising the addition to the molten sulfur of an effective amount of a degassing agent, said degassing agent selected from the class consisting of inorganic phosphorous compounds, urea and urea derivatives without the further addition to the molten sulfur of sulfur dioxide.

2. The method of claim 1 wherein the inorganic phosphorous compounds are selected from the class consisting of phosphates, phosphines, phosphites, phosphine oxides, phosphine sulfides and hypophosphates.

3. The method of claim 2 wherein the inorganic phosphorous compounds are selected from the class consisting of triammonium orthophosphate and diammonium hydrogen phosphate.

4. The method of claim 1 wherein the urea derivatives are selected from the class consisting of mono-, di-, tri- and tetra ureas, thiourea and cyclic ureas.

5. The method of claim 1 wherein the rate of addition of the degassing agent to the molten sulfur ranges from about 1 part per billion to about 5000 parts per million by weight.

6. The method of claim 5 wherein the rate of addition of the degassing agent to the molten sulfur ranges from about 50 to about 200 parts per million by weight.

7. The method of claim 1 wherein the hydrogen sulfide and hydrogen polysulfides are at least partially removed from the molten sulfur in a sulfur installation comprising an inlet, an inspection box communicating with the inlet, an outlet communicating with the inspection box, and a sulfur storage facility communicating with the outlet, the molten sulfur flowing from the inlet through the inspection box and the outlet to the sulfur storage facility, the method comprising the addition of the degassing agent to the inspection box, whereby the degassing agent becomes intermixed with the molten sulfur to thereby release at least a portion of the hydrogen sulfide and hydrogen polysulfides during the residence time of the molten sulfur in the sulfur storage facility.

8. A method for reducing the hydrogen sulfide or hydrogen polysulfides present in molten sulfur which comprises treating the molten sulfur with an effective amount of a degassing agent, said degassing agent consisting essentially of inorganic phosphorous compounds, urea and urea derivatives.

9. The method of claim 8 wherein the inorganic phosphorous compounds are selected from the class consisting of phosphates, phosphines, phosphites, phosphine oxides, phosphine sulfides and hypophosphates.

10. The method of claim 8 wherein the urea derivatives are selected from the class consisting of mono-, di-, tri-, and tetra-ureas, thiourea, and cyclic urea.

11. A method for reducing the concentration of hydrogen sulfide and hydrogen polysulfides in molten sulfur in a sulfur installation of the type having an inlet, an inspection box communicating with the inlet, and outlet communicating with the inspection box, and a sulfur pit communicating with the outlet, the molten sulfur flowing from the inlet through the inspection box and outlet into the sulfur storage facility, the method comprising the addition of an effective amount of a degassing agent to the inspection box, the degassing agent intermixing with the sulfur to release at least a portion of the hydrogen sulfide and hydrogen polysulfides during the residence of the molten sulfur in the sulfur storage facility.

12. The method of claim 11 wherein a source of the degassing agent is disposed at an elevation above that of the inspection box, the degassing agent being added by gravity flow to the inspection box.

* * * * *